United States Patent [19]
Hellsten

[11] Patent Number: 5,488,373
[45] Date of Patent: Jan. 30, 1996

[54] SIGNAL PROCESSING APPARATUS FOR SYNTHETIC APERTURE RADAR

[76] Inventor: Hans Hellsten, Palmaers gata 6, S-582 49 Linköping, Sweden

[21] Appl. No.: 122,482

[22] PCT Filed: Mar. 23, 1993

[86] PCT No.: PCT/SE92/00184

§ 371 Date: Sep. 27, 1993

§ 102(e) Date: Sep. 27, 1993

[87] PCT Pub. No.: WO92/16856

PCT Pub. Date: Oct. 1, 1992

[30] Foreign Application Priority Data

Mar. 25, 1991 [SE] Sweden .................................. 9100898

[51] Int. Cl.⁶ ............................................. G01S 13/90
[52] U.S. Cl. .............................................. 342/25; 342/195
[58] Field of Search ..................................... 342/25, 195

[56] References Cited

U.S. PATENT DOCUMENTS

| | | | |
|---|---|---|---|
| 4,034,370 | 7/1977 | Mims | 343/5 CM |
| 4,471,357 | 9/1984 | Wu et al. | 343/5 CM |
| 4,617,567 | 10/1986 | Chan | 342/25 |
| 4,771,287 | 9/1988 | Mims | 342/25 |
| 4,866,446 | 9/1989 | Hellsten | 342/25 |
| 4,963,877 | 10/1990 | Wood et al. | 342/25 |
| 4,965,582 | 10/1990 | Hellsten | 342/25 |
| 4,985,704 | 1/1991 | Smith | 342/25 |

FOREIGN PATENT DOCUMENTS 0131907 1/1985 European Pat. Off. .

Primary Examiner—John B. Sotomayor
Attorney, Agent, or Firm—Jacobson, Price, Holman & Stern

[57] ABSTRACT

A signal processing apparatus for use in SAR radar. The signal processing apparatus uses a new method of processing SAR images, primarily for wide band SAR. The new method is based on the numerical unfolding of differential equations along the flight path. The method makes motion compensation possible and can be used along a curved flight path and irrespective of the acceleration of the aircraft. Moreover, the method makes real time processing possible.

20 Claims, 7 Drawing Sheets

SIGNAL PROCESSING APPARATUS FOR SYNTHETIC APERTURE RADAR

BACKGROUND OF INVENTION

A fundamental problem in synthetic aperture radar technique (SAR) is that, in its traditional form it, presupposes that an aircraft moves a relatively long distance along a straight path. When the SAR technique is driven to more extreme performances, this becomes a problem also in so far as it is not even possible to fly with the accuracy that is required. Moreover, military use may make it necessary to be able to make the SAR registrations while the aircraft is maneuvering.

In the wide band low frequency SAR called CARABAS, that has been patented under the Swedish patent no. 8406007-8, motion compensation is an important problem, as a registration is carried out during an approximately 10 km long distance, during which the accelerations must be less than $10^{-1}$–$10^{-3}$ ms$^{-2}$ (depending upon reconnaissance distance and desired resolution), if a traditional SAR signal processing shall be used.

Methods have evolved in the SAR technique to compensate for movements. These are essential for the SAR technique as it is regularly used today in modern reconnaissance and attack aircrafts. These methods are, however, approximative and while they work for narrow band microwave SAR, having relatively short aperture distances, they can't be used for CARABAS.

The foregoing problem is solved by the present invention.

SUMMARY OF THE INVENTION

The invention provides a completely new method of processing SAR images, first of all for wide band SAR, that is carabas, but probably also capable of being used for narrow band SAR. While the conventional SAR processing is based upon Fourier transform techniques, or related convolution and correlation techniques, the method of the present invention is based on the numerical unfolding of differential equations along the flight path. The Fourier transform method is a special case (as a matter of fact an analytic solution to the differential equation in the case of a straight flight path). This method has several considerable advantages. For example, the method can be used along a curved flight path and irrespective of whether the aircraft accelerates. The form of the path must, however, be known in the form of accelerations, that are taken from the inertial navigation system.

Apart from motion compensation the method makes real time processing possible, where the SAR system functions as a so called line camera. In other words, real time imaging of the ground surface along a beam of desired direction from the aircraft is made possible. By means of the aircraft motion, a 2-dimensional image is gradually created.

The signal processing method can be divided into independent processes for each frequency in a wide band signal. It is extremely suitable for implementation in a massively parallel dedicated processor, based on perhaps 1000 identical ASIC circuits, (ASIC=Application Specific Integrated Circuit), each handling the process for one or a few of these frequencies.

BRIEF DESCRIPTION OF THE DRAWINGS

Finally.

DESCRIPTION OF THE PREFERRED EMBODIMENTS

A preferred embodiment of the present invention will now be described with reference to FIGS. 1–6.

Figure 1:
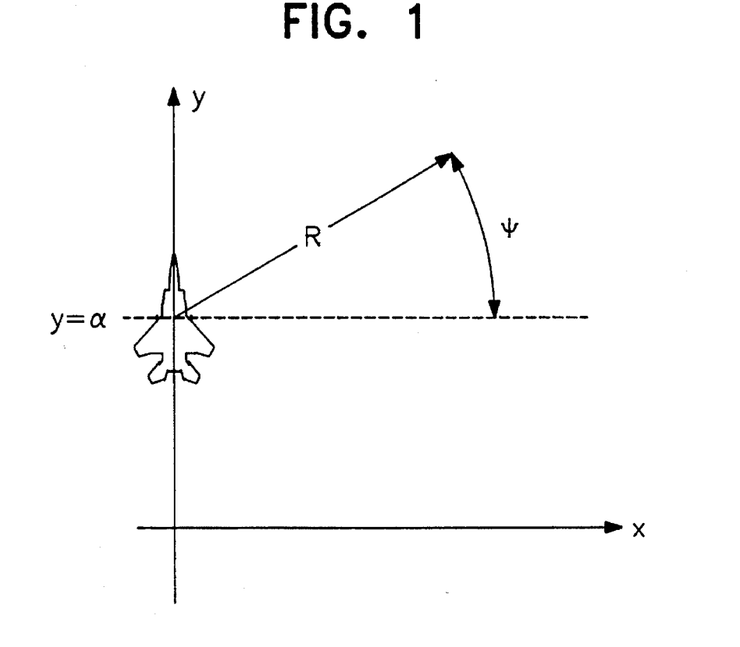
FIG. 1 shows geometrical conventions for aperture position α, bearing ψ and range R.
Figure 2A:
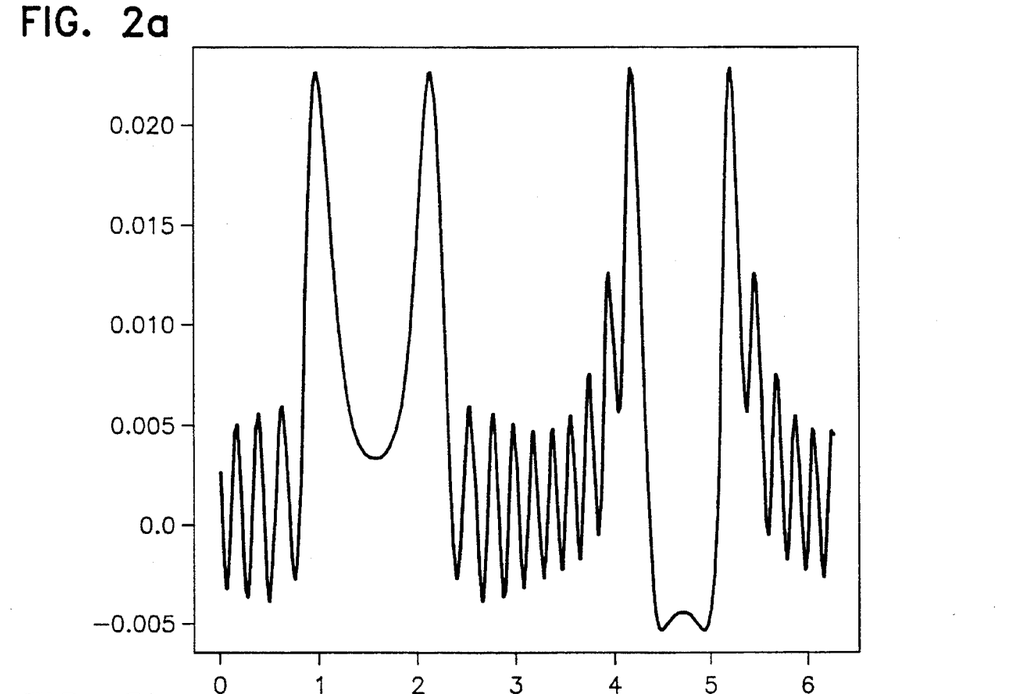
FIGS. 2a–2d show successive steps of the numerical unfolding of the node equations for k=1 and with step size Δα=1.75.
Figure 2B:
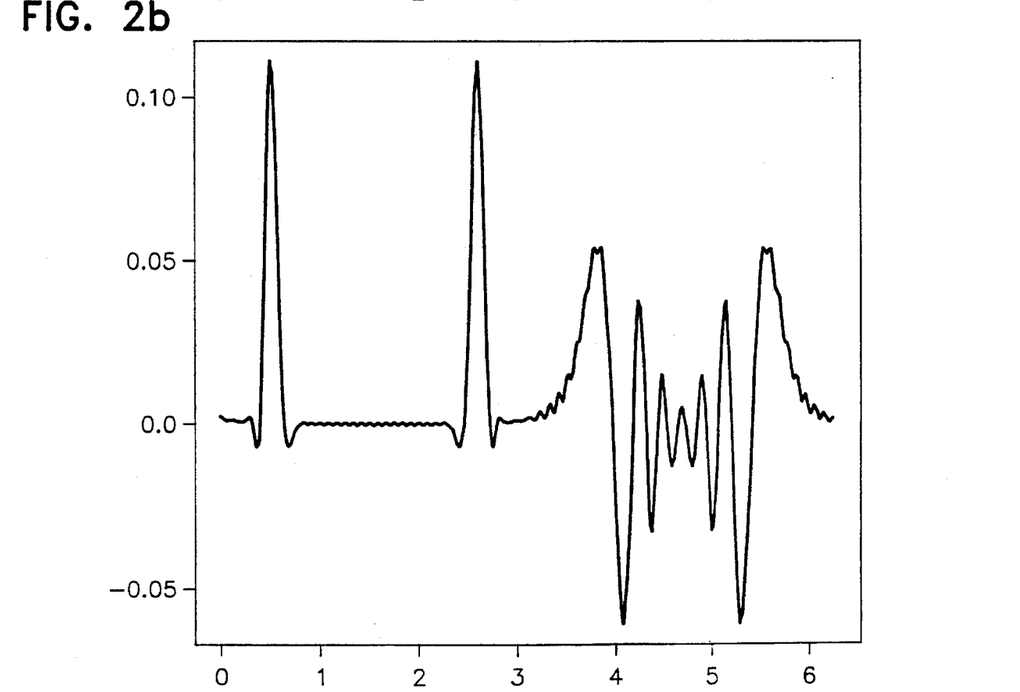
Figure 2C:
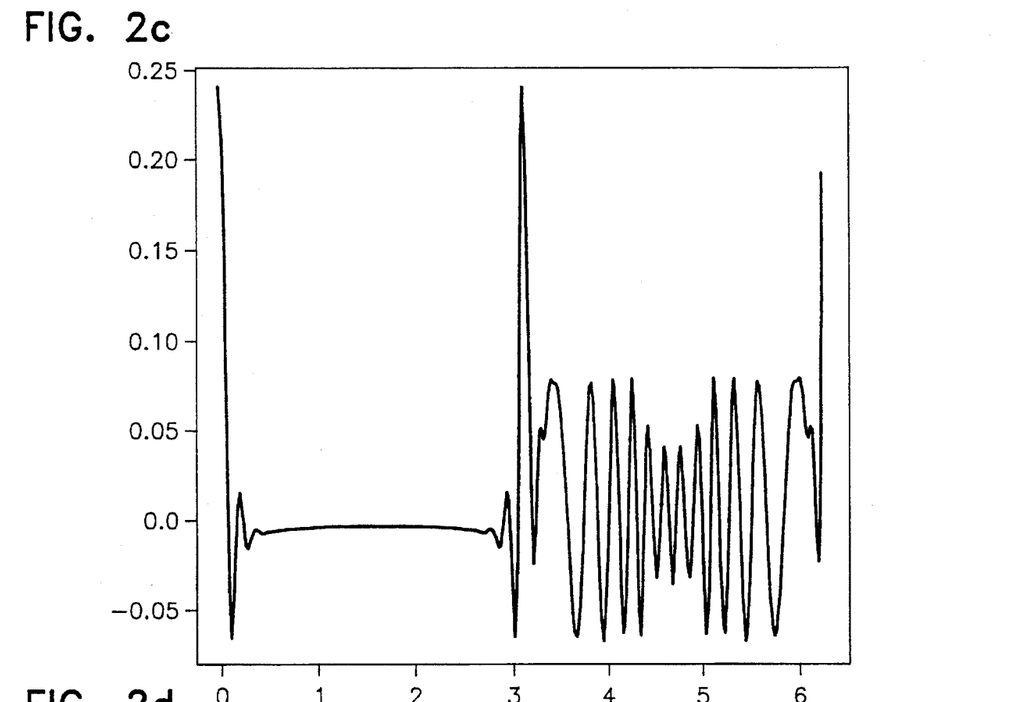
Figure 2D:
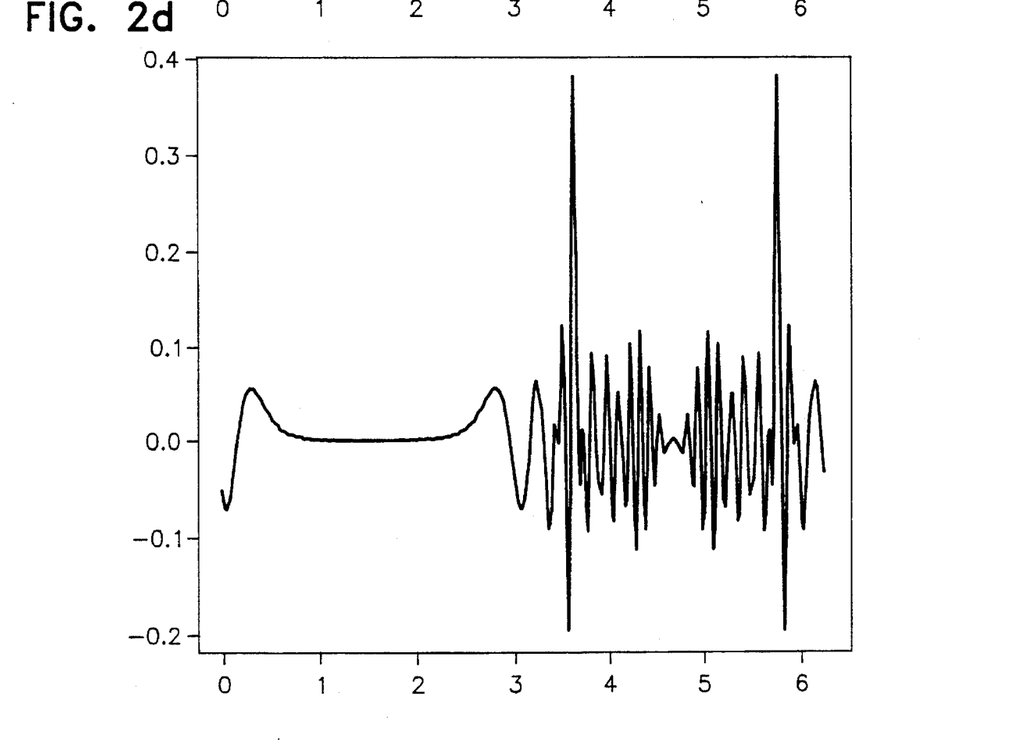

FIG. 1 shows geometrical conventions for aperture position α, bearing ψ and range R.

FIGS. 2a–2d show successive steps of the numerical unfolding of node equations for k=1 and with step size Δα=1.75. The scene comprises a single point-target in the position (x,y)=(140,64) for which data are simulated numerically. FIGS. 2a, 2b, 2c and 2d illustrate respectively the positions α=35, 105, 140 and 175. The abscissa represents bearing in radians, measured in the positive direction according to FIG. 1. It is evident (which is a well known characteristic of SAR) that reflexes from the right and left side can't be discriminated by SAR processing alone, that is, the single point reflex appears together with its "mirror image" (x,y)=(–140,64) in the flight axis.

Figure 3A:
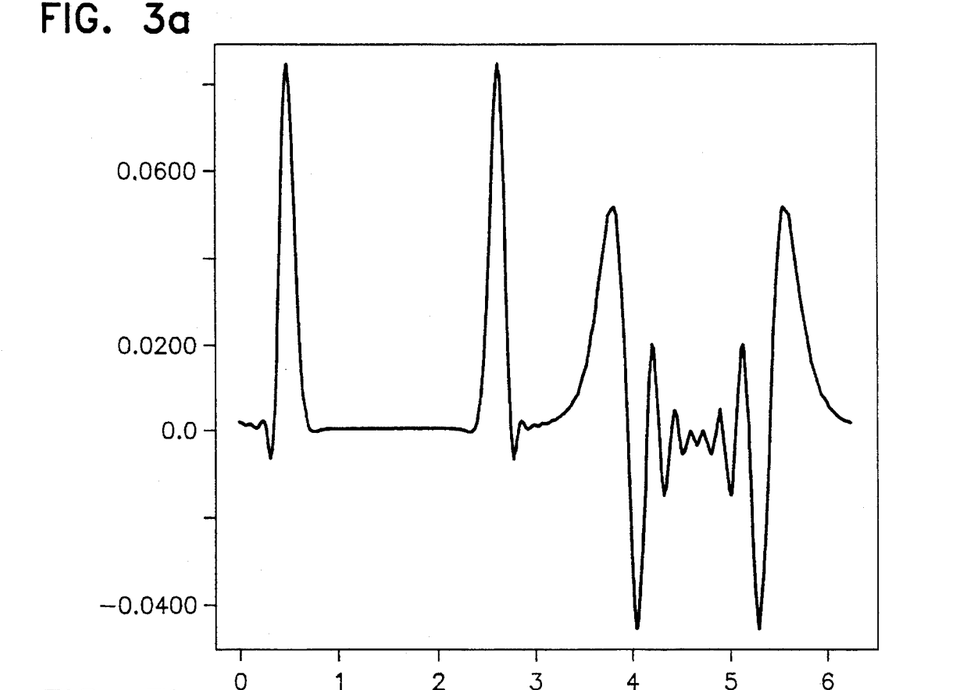
FIGS. 3a–3d show the numerical unfolding of the node equations for k=1 and the same point target, but for different step sizes with FIGS. 3a–3d respectively showing the solution at the fixed aircraft position α=105, for step sizes Δα=2.1, Δα=1.5 and Δα=0.5, and wherein, for the purpose of comparison, the true solution $C_{ideal/105}$ been included in FIG. 3d.
Figure 3B:
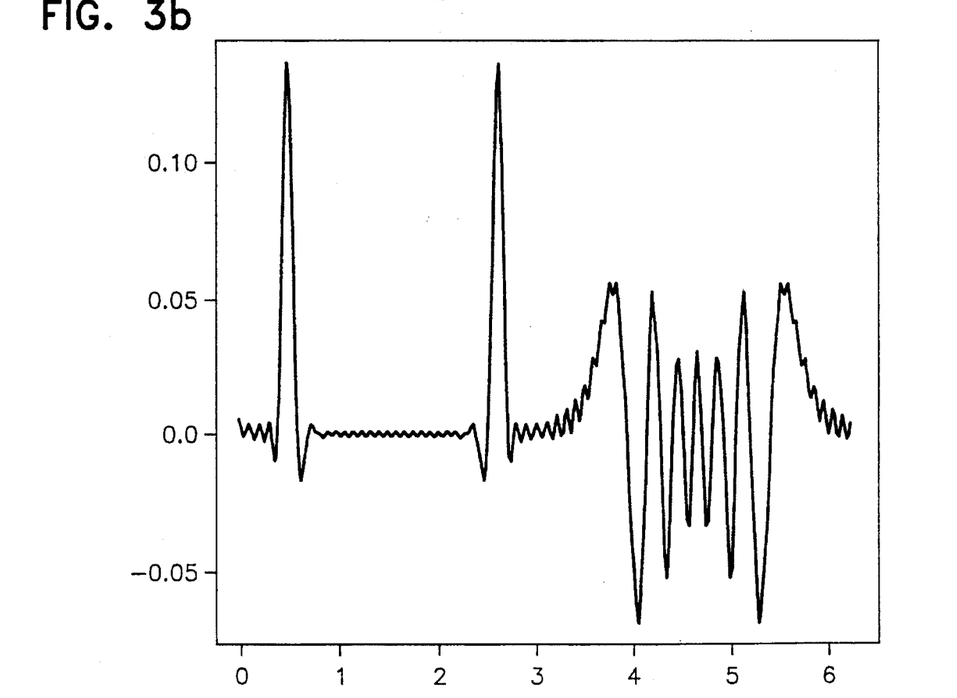
Figure 3C:
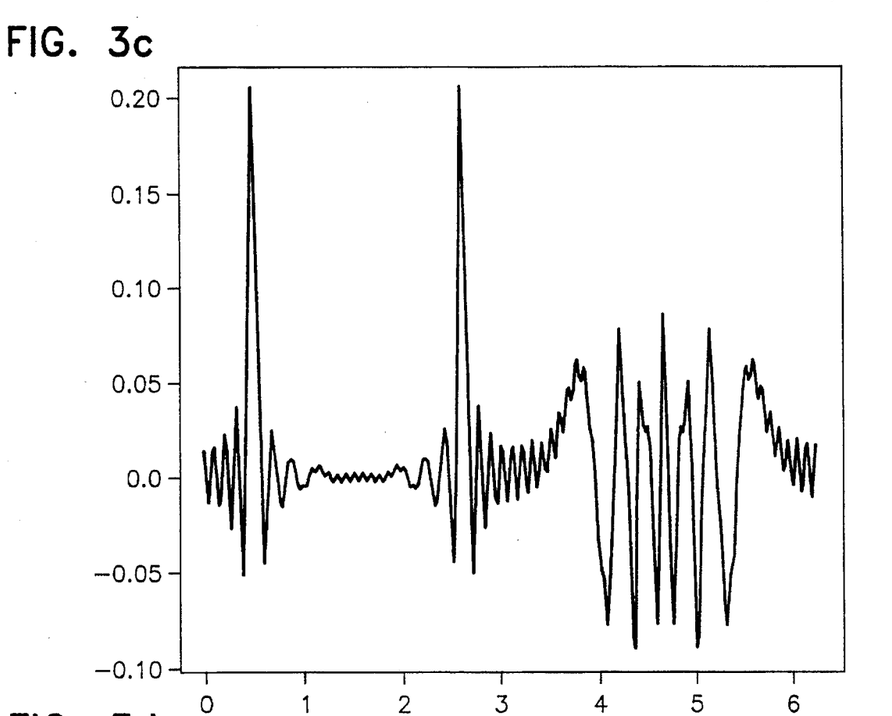
Figure 3D:
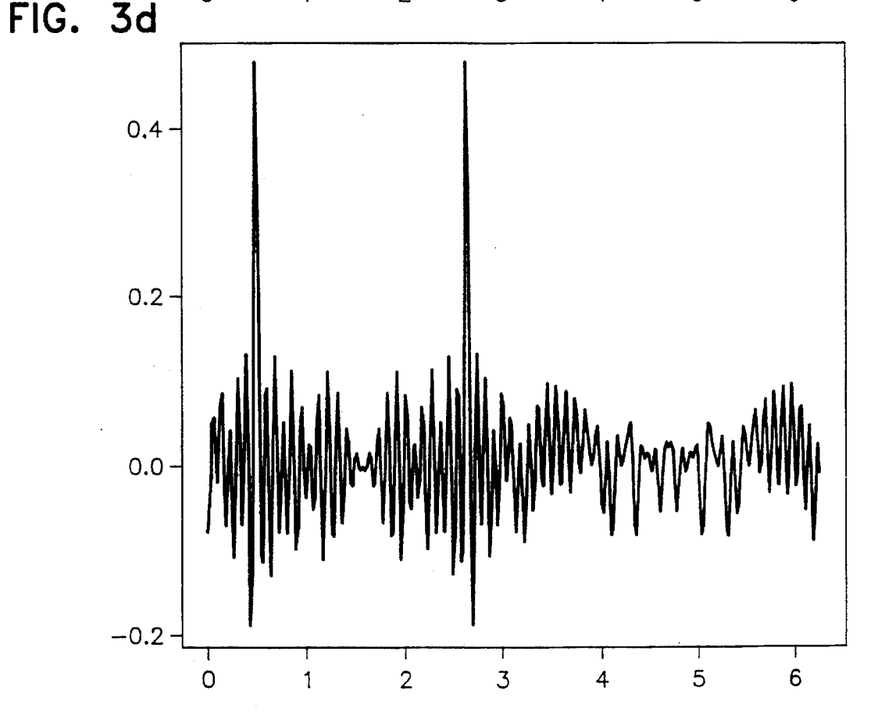

FIGS. 3a–3d show the numerical unfolding of the node equations for k=1 and the same point target, but for different step sizes with FIGS. 3a–3d respectively showing the solution at the fixed aircraft position α=105, for step sizes Δα=2.1, Δα=1.5 and Δα=0.5 and wherein for the purpose of comparison, the true solution $C_{ideal/105}$ has been included in FIG. 3d.

Figure 4A:
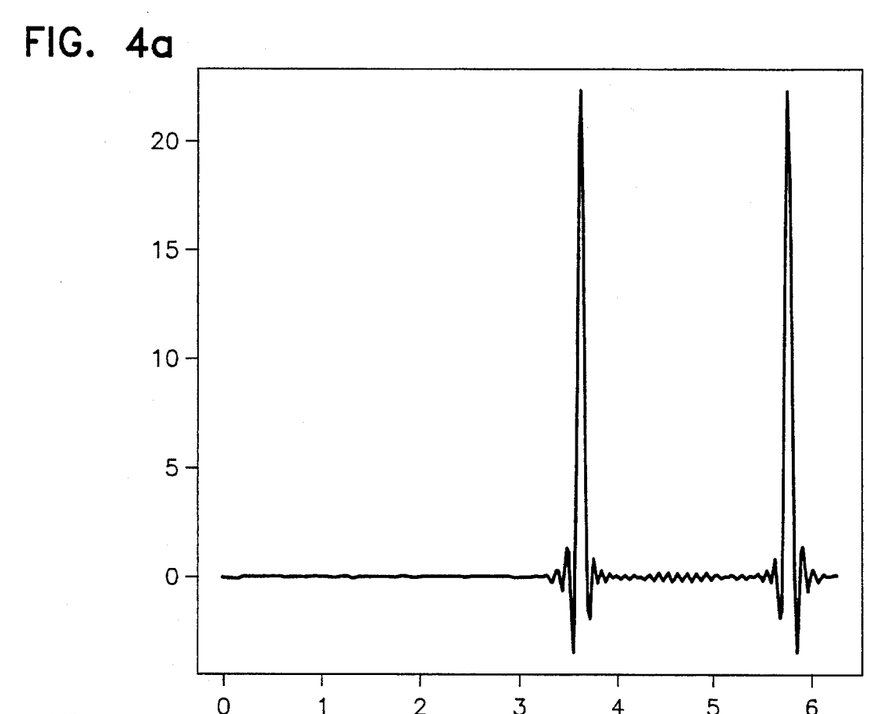
FIGS. 4a and 4b show the effect of k-integration with respect to 100 discrete k values within the interval 0.01≦k≦1, wherein FIGS. 4a and 4b respectively depict angular and range dependence for the previous point target at the aperture position α=175 and for Δα=1.75.
Figure 4B:
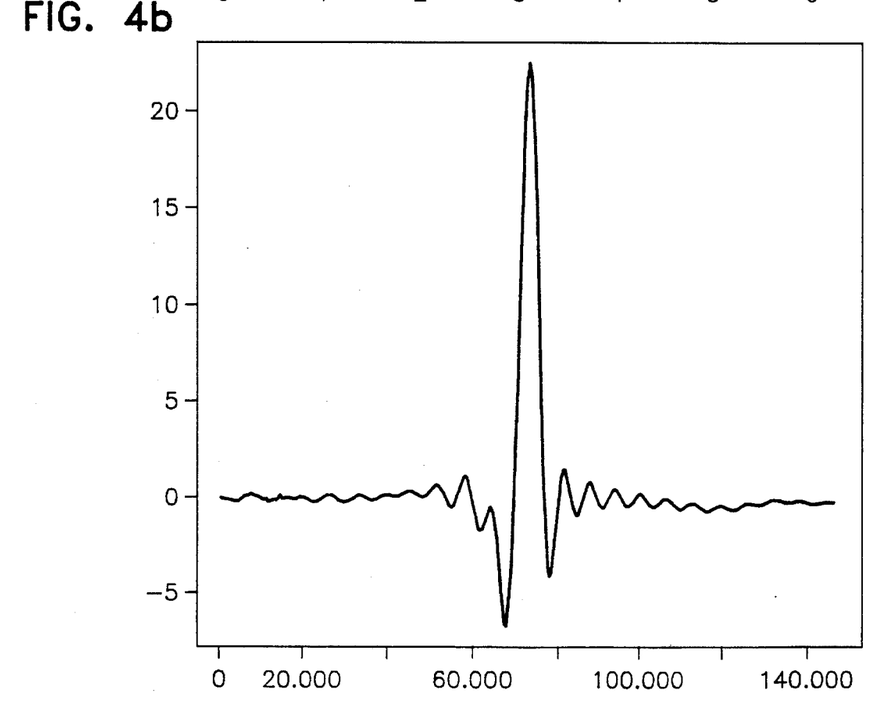

FIGS. 4a and 4b show the effect of k–integration with respect to 100 discrete K values with the interval 0.01≦k≦1, wherein FIGS. 4a and 4b respectively depict angular and range dependence for the previous point target at the aperture position α=175 and for Δα=1.75.

Figure 5:
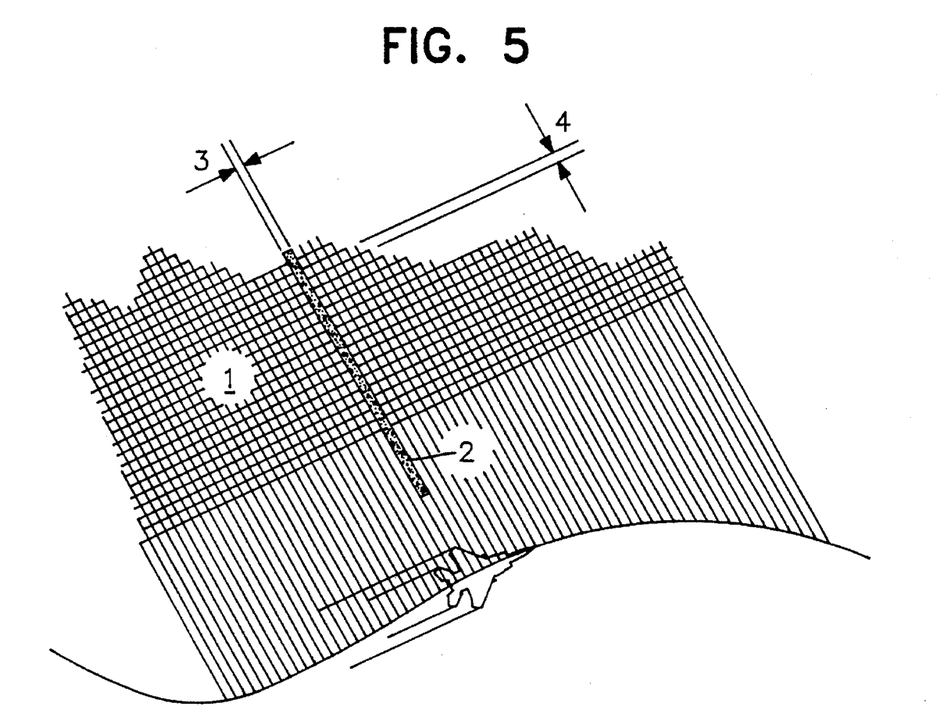
FIG. 5 shows the definition of a stabilized image line.
Figure 6:
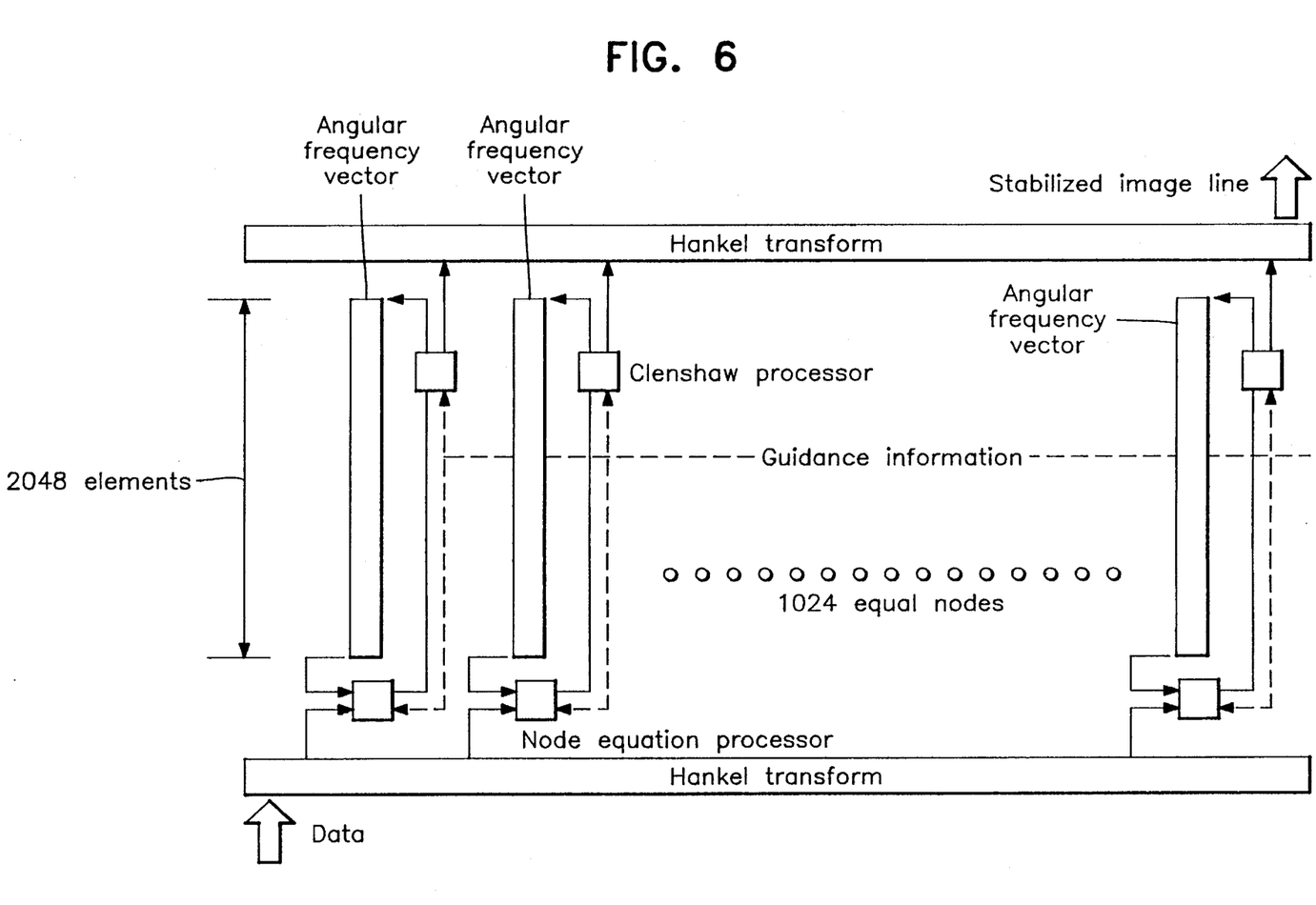
FIG. 6 shows an architecture for a signal processing equipment according to the invention.

FIG. 5 shows the definition of a stabilized image line, and finally FIG. 6 shows an architecture for a signal processing apparatus according to the invention.

A formal mathematical description of the invention and definitions will now be provided as follows:

Radar gives a bad angular resolution but a good range resolution. In the preferred embodiment of the invention the angular resolution is assumed to be non-existing, that is, the radar is completely omnidirectional. SAR is a method for transforming the good range resolution into an image having good angular resolution as well, starting from radar data that are continuously registered along a known flight path. The SAR image is represented as a function $F_\alpha(R,\Psi)$ where $R,\Psi$ are polar coordinates for the SAR image with R=range, $\Psi$=bearing and $\alpha$=aperture position. $F_\alpha(R,\Psi)$ is decomposed into components $C_{\alpha k l m}$ with respect to an orthogonal basis function system $W_{klm}(R,\Psi)=e^{im\Psi}J_m(kR)$ where $J_m$ is the mth order Bessel function and k and m are the radial and the angular frequency $$F_\alpha(R,\Psi) = \int_0^{k_{max}} \sum_{m=-Rk}^{Rk} C_{\alpha klm} W_{klm}(R,\Psi) k\,dk \qquad (0.1)$$

The highest radial frequency $k_{max}$ is defined by the highest frequency transmitted by the radio transmitter. Radar data $S_\alpha(R)$ can be seen as the zero order truncation of $F_\alpha(R,\Psi)$ with respect to angular frequency, that is $$S_\alpha(R) = \int_0^\infty C_{\alpha k l 0} J_0(kR) k\,dk \qquad (0.2)$$

Formally (0.2) is a 3 so called zero order Hankel transform (as described in Hansen E. W. (1985): "Fast Hankel Transform Algorithm", IEEE Trans. Acoust., Speech, Signal Processing, vol. ASSP-33 (1985), pp.666–671). The relation $$i\frac{\partial}{\partial\alpha} C_{\alpha klm} = \frac{k}{2}(C_{\alpha klm+1} + C_{\alpha klm-1}) \qquad (0.3)$$

is satisfied for rectilinear aircraft motion and is called the node equation. As $J_m(kR)\approx 0$ if $|m|\geq kR$, $C_{\alpha klm}\approx 0$ if $m\geq kR_{max}$. As the Hankel transform is the inverse of itself, $C_{\alpha kl0}$ follows from radar data $$C_{\alpha kl0} = \int_0^{R_{max}} S_\alpha(R) J_0(kR) R\,dR \qquad (0.4)$$

Consequently, the node equation is subjected to boundary conditions in each strip $0<m<kR_{max}$ and $-kR_{max}<m<0$ and can be integrated numerically. Hereby the vector $C_{\alpha klm}$, all its angular frequency terms included, is determined solely from radar data, that is, the coefficients $C_{\alpha kl0}$, available over a long enough interval of the synthetic aperture, that is the $\alpha$-parameter.

The node equation is integrated according to the usual practice for numeric integration of ordinary differential equations. As the integration steps should be long and on a level with the sampling density for radar data along the flight path, accurate higher order integration methods should be used. Two suitable methods, namely the trapezoidal method or the Crank-Nicholson method and the classical Runge-Kutta method, have been tested with good results.

In the case of a flight path which is not completely rectilinear, and instead a curved one, compensation for the turning of the aircraft must be introduced in the integration cycle alternately with the integration steps in the node equation. If the length of the integration step is $\delta\alpha$ and the turning means a change of course $\delta\Psi$ during this integration step, the computation of the C-coefficients is then done, during an integration cycle, according to $$\rightarrow C_{\alpha klm} \rightarrow C_{\alpha+\delta\alpha klm} \rightarrow e^{-im\delta\Psi} C_{\alpha+\delta\alpha klm} \rightarrow \qquad (0.5)$$

As radar data are sample with a given frequency and the computation is carried out with a speed that is related to this frequency, the step size $\delta\alpha$ becomes related to the speed of the aircraft v according to $\delta\alpha=v.dt$, where dt is the time of the integration cycle.

An image line is defined by the function $F_\alpha(R,\Psi)$ for $\alpha$ fixed and along a fixed angle $\Psi=\Psi_0$. In order to derive the complete SAR image it is only necessary to calculate one image line at each integration step. If the flight path is perfectly straight the SAR image 1 can be derived as the 2-dimensional image line representation $F_\alpha(R,\Psi_0)$ with R and $\alpha$ variable, obtained by the expression (0.1) and with the C-coefficients obtained from the node equation. The best SAR resolution is obtained if $\Psi_0$ is chosen to the rear, for example, 150° from the direction of the aircraft motion. A stabilized image line 2 means that $\Psi=\Psi_\alpha$ varies along the flight path, based on the turning of the aircraft, so that the image lines become parallel all the time, as illustrated in FIG. 5. In FIG. 5, the SAR-resolution from data received up to the time for the image line is indicated by reference numeral 3 and the range resolution by reference numeral 4.

In order to calculate an image line starting from (0.1) it is noted that $$\frac{2m}{kR} W_{klm}(R,\Psi) = e^{i\Psi} W_{klm-1}(R,\Psi) + e^{-i\Psi} W_{klm+1}(R,\Psi),$$

This recurrence relation leads to a recurrence method (Clenshaw's algorithm, which is described, for example, in Press W. H. et al. (1986): Numerical Recipes, Cambridge University Press, Cambridge) for a fast evaluation of the sum with regard to index m in (0.1). For each range R the sum will be an expression in zero and first order Bessel functions, whereby the image line can be derived by calculating the zero and first order Hankel transforms.

It remains to be observed that index k is passive both in the node equation and in the compensation for curves. The calculation of the coefficients $C_{\alpha klm}$ can thus be divided into processes that go on in parallel for each fixed k, where k is regarded as discreted to a finite number of values. For k and $\alpha$ fixed, $C_{\alpha klm}$ become vectors comprising terms representing different angular frequencies. Further, it is observed that the Hankel transforms before and after the calculation of the C-efficients are independent of this calculation and can be performed in parallel. We have thus derived an architecture of memories (angular frequency vectors) and processors (Hankel transform, node equation, Clenshaw) which make possible a real time presentation, compensating for motion errors in the SAR flight, as illustrated in FIG. 6.

The idea of the invention is presented more completely in the following.

§1 INTRODUCTION

A natural starting point in deriving algorithms for wide band synthetic aperture radar (SAR) image processing is that of integral geometry. Formulated in these terms, the SAR configuration corresponds to an analytically solvable integral equation. Such solvable equations also arise in e.g. tomography and seismic migration. Numerical implementation of their analytical solutions provides stable image processing schemes. However, for radar this type of processing method has the drawback that data must be completely known before processing can commence. The approach is thus unsuitable for real time imaging, motion compensation in SAR, adaptive radar and other applications requiring continuous control over the imaging process. Accordingly SAR processing is herein re-formulated based on differential rather than integral equations. These differential equations will be referred to as the node equation for the application considered, which they completely characterize. As will be demonstrated, the node equations can be integrated numerically in the course of time in a way that provides the required control over the integration procedure.

The integration of the node equations might be termed cumulative. A low resolution image available at a certain time along the synthetic aperture, together with the data registered at this moment of time, form the basis for constructing an image of slightly improved resolution. In turn, this image together with further data form the basis for providing a still better image, valid at a still later time and so forth. The method seems very suitable for implementation in massively parallel processors, which processing capability in fact is required for real time processing in realistic systems.

The method as developed here understands primarily (but not exclusively) a wide band SAR application providing omnidirectional or nearly omnidirectional SAR data, while the resolution attained is limited only by the wavelength (typically, a system would operate over a large relative bandwidth at meter wavelengths, adopting a broad band dipole antenna system rather than a parabolic mirror for transmission/reception, as described in Hellsten H. (1990): "Inverse Scattering Analysis of Diffraction limited SAR", IEEE Trans. Ant. & Prop . . . , vol. 38, no. 10 (1990), pp. 1517–1522. In this case, real time processing becomes both more complex and important than for narrow band imaging. In wide band systems, the actual registration time in order to fully resolve even one point on the ground is connected to the demand for large aspect angle variations (typically 90°–120°). If the object to be imaged is far away, the required registration time may be quite long, say of the order of 100 s. Intermediate results, at lower though increasing resolution, continuously at hand during this interval of time, would very much increase the practicality of the synthetic aperture wide band technique. It may in fact be quite necessary in any practical application to possess real time image processing capabilities, since wide band radar raw data are even more white and featureless than data from narrow band synthetic aperture systems. The proper functioning of the radar system can thus be checked only by the actual processing of data.

The node equations were derived originally as an attempt at casting the three radar imaging configurations SAR, ISAR and multistatic arrays into a unified framework based on symmetry groups. Little thought was given from the outset to aspects of numerical implementation. In this regard, reference is made to Hellsten H. (1990): "Image Reconstruction by Means of Linear Aperture Radar Data", FOA report C 30564-3.3 (in Swedish), Linkoping. As indicated by Gustavsson J. (1989): "A Numerical Implementation of the ISAR Algorithm", FOA report D 30543-3.3, Linkoping was found later that the obvious forward finite difference implementation of the equations proved numerically unstable when applied to ISAR. A stabilization scheme (equivalent to the stationary method to be discussed here) was derived by Lars-Erik Andersson, University of Linköping, for the ISAR algorithm, which when tested numerically, produced excellent results (as indicated by Nilsson S. (1990): "A Fourier Method for the Stabilization of an ISAR Algorithm", FOA report D30578-3.3, Linkoping). The focus of the following description will be SAR, with the intended application of imaging a ground surface by an airborne radar. By focusing on one type of radar configuration, there is no need to involve group theoretical or other generalized methods. The derivation of the node equation will therefore be straightforward. The following description will then proceed to derive some properties of its solution, including a description of method for numerical implementation both in order to obtain maximum resolution if there is no real time processing requirement, and an implementation suited for real time conditions, in which full resolution cannot be expected.

§2 POLAR COORDINATE REPRESENTATION OF REFLECTIVITY

The derivation of the differential formulation starts from the following assumption regarding the representation of radar reflectivity $$F_\alpha(R, \Psi) = \int_0^{k_{max}} \sum_{m=-Rk}^{Rk} C_{\alpha k l m} e^{im\Psi} J_m(kR) k \, dk. \tag{2.1}$$

Here $K_{max}$ represents the range bandwidth and thus resolution with which $F_\alpha(R,\Psi)$ is represented (the question of resolution is addressed in §4 which follows). Summation has been truncated in (2.1) according to $J_m(kR) \approx 0$ if $|m| \geq kR$. As represented in (2.1), the reflectivity is a function of three parameters, each further defined as follows $\alpha$ denotes a particular position on the synthetic aperture axis (called aspect), R denotes range (3-dimensional distance between the radar and any particular point on the ground), $\Psi$ denotes the synthetic aperture angular resolution coordinate (resolution with respect to $\Psi$ increases as the synthetic aperture interval increases).

While $\alpha$ and R are completely defined by these statements ($\alpha$ may be identified with the aircraft position), $\Psi$ is not. A definition valid for ISAR and multistatic configuration, apart from SAR, can be found in Hellsten H. (1990): "Image Reconstruction by Means of Linear Aperture Radar DATA", FOA report C 30564-3.3 (in Swedish), Linkoping. Here the focus is on SAR. The synthetic aperture axis is denoted y and the slant range is denoted $x = \sqrt{R-(y-\alpha)^2}$. Angular resolution enhancement is achieved in the x,y-plane (the plane of SAR-image) by the motion of the radar platform along the y-axis. $\Psi$ denotes this angular variable. The x,y-plane may thus be represented by the polar coordinates R, $\Psi$, where $\Psi$ is the polar angle, R the polar radius, and $y=\alpha$ is the current origin of this polar coordinate system. See FIG. 1.

Radar data will be considered a function $S_\alpha(R, \Psi)$ of much lower angular resolution than the reflectivity function $F_\alpha(R, \Psi)$. Considering the ultimate case of total isotropy in which radar data will coincide with a zero order truncation of the summation in (2.1)

$$S_\alpha(R, \Psi) = \int_0^\infty C_{\alpha k i 0} J_0(kR) k \, dk. \tag{2.2}$$

Realistic SAR antennas can be dealt with if one considers higher order truncations of (2.1) (for a low frequency dipole antenna SAR, the first order will suffice, as indicated by Hellsten H. (1990): "Inverse Scattering Analysis of Diffraction limited SAR", IEEE Trans Ant. & Prop . . . , vol. 38, no 10 (1990), pp. 1517–1522. Focusing on basic principles, the following analysis is restricted to the zero order truncation only.

Bessel functions can be obtained from an integral representation $$J_m(x) = \frac{1}{2\pi} \oint e^{i(m\Psi - x\sin\Psi)} d\Psi, \tag{2.3}$$

which implied the relation $J_{-m}(x) = (-1)^m J_m$. From (2.3) follows the orthogonality relation $$\int_0^\infty J_m(kx) J_m(kx') k \, dk = \delta(x - x'). \tag{2.4}$$

Radar data determine the coefficients $C_{\alpha k l 0}$ according to $$C_{\alpha|k|0} = \int_0^{R_{max}} S_\alpha(R, \Psi) J_0(kR) R dR. \qquad (2.5)$$

Accordingly, the coefficients $C_{\alpha|k|0}$, for all $\alpha$ and $k$, follow from knowledge of radar data (2.2). Given a reflectivity function $F_\alpha(R,\Psi)$ at any fixed $\alpha$ the coefficients follow for all $m$ and $k$ according to $$C_{\alpha|klm} = \frac{1}{2\pi} \oint \int_0^{R_{max}} F_\alpha(R, \Psi) e^{-im\Psi} J_m(kR) R dR d\Psi. \qquad (2.6)$$

Assuming a reflectivity function which is translation invariant with respect to the motion $\alpha \to \alpha + \Delta\alpha$ of the SAR aircraft along the y-axis, such a function can be represented as: (the integral extending over all space)

$$F_\alpha(R,\Psi) = \int \rho(x,y) \delta(x - R\cos\Psi) \delta(y - \alpha - R\sin\Psi) dx dy, \qquad (2.7)$$

with respect to a spatially fixed density function $\rho(x,y)$. Given the assumption (2.7), the coefficients $C_{\alpha|klm}$ transform in a straightforward fashion undeer translations. The transformation rule will now be derived.

The case of just one single point reflector located at $(x,y)$ will be considered, namely, $$F_\alpha(R,\Psi) = \delta(x - R\cos\Psi) \delta(y - \alpha - R\sin\Psi). \qquad (2.8)$$

The coefficients (2.6), corresponding to this situation, are denoted $c(x,y)_{\alpha|klm}$. Assuming $x>0$, one finds that $$c(x, y)_{\alpha|klm} = e^{-im\arctan[(y-\alpha)/x]} J_m[k\sqrt{x^2 + (y-\alpha)^2}]. \qquad (2.9)$$

The case of a negative x-coordinate, that is, an angle $|\Psi| > \pi/2$, is not reached by (2.9), since the arctan-function is obtained modulus $\pi$. Hence $c(-x,-y)_{\alpha|klm} = (-1)^m c(x,y)_{\alpha|klm}$. Differentiating (2.9) with respect to $\alpha$, yields $$\frac{\partial}{\partial\alpha} c(x, y)_{\alpha|klm} = \qquad (2.10)$$

$$im \frac{x}{x^2 + (y-\alpha)^2} e^{-im\arctan[(y-\alpha)/x]} J_m[k\sqrt{x^2 + (y-\alpha)^2}] -$$

$$k \frac{y-\alpha}{\sqrt{x^2 + (y-\alpha)^2}} e^{-im\arctan[(y-\alpha)/x]} J_m'[k\sqrt{x^2 + (y-\alpha)^2}].$$

The well-known recurrence relations $$\frac{2m}{kR} J_m(kR) = J_{m-1}(kR) + J_{m+1}(kR), \qquad (2.11)$$

$$2J_m'(kR) = J_{m-1}(kR) - J_{m+1}(kR),$$

reduce the expression to (where $x>0$)

$$\frac{\partial}{\partial\alpha} c(\pm x, y)_{\alpha|klm} = \pm \frac{ik}{2} [c(\pm x, y)_{\alpha|klm-1} + c(\pm x, y)_{\alpha|klm+1}]. \qquad (2.12)$$

Due to the translation invariance assumption (2.7), there is for a continuous reflectivity density $\rho(x,y)$, vanishing for negative $x$ $$C_{\alpha|klm} = \int \rho(x,y) c(x,y)_{\alpha|klm} dx dy, \qquad (2.13)$$

which implies $$\frac{\partial}{\partial\alpha} C_{\alpha|klm} = \int \rho(x, y) \frac{\partial}{\partial\alpha} c(x, y)_{\alpha|klm} dx dy. \qquad (2.14)$$

Hence, relations similar to (2.12) are valid also for a continuous reflectivity distribution $$\frac{\partial}{\partial\alpha} C_{\alpha|klm} = \frac{ik}{2} [C_{\alpha|klm-1} + C_{\alpha|klm+1}]. \qquad (2.15)$$

Note that (2.15) is restricted to the right-hand side $x>0$. The left-hand equation is obtained, changing the overall sign on the right-hand side of (2.15).

The triples $\alpha$, $k$, $m$, being suitably made discrete, will be referred to as nodes. Connecting these nodes, the equations (2.15) will be referred to as the node equation system.

§3 INTEGRATION OF THE NODE EQUATIONS.

The node equations constitute a fundamental mathematical description of the SAR problem. Imposing appropriate boundary conditions, determined by properties of the radar system and radar data, the equations can be integrated and SAR images obtained. The integration can be carried out analytically, and the analytical solution implemented in computer processes, or computer processes may be devised for direct numerical integration. Analytically the node equation's solution is obtained, observing that any 2-dimensional plan wave is an eigen-solution to (2.15). Expansion into eigen-solutions will be referred to as the stationary method of integration.

The direct numerical method resembles to a certain extent a diffusion process. In fact, the right-hand side of (2.15) has the same form as a discrete second order partial derivative in the m-direction, which sets up an analogue between the node equation system and a parabolic partial differential equation of the Schrödinger type. According to this method, any guess, e.g. a white noise distribution or even a zero density $\rho_{guess}$, may initially, i.e. at $\alpha=0$, be assumed for computing $C_{0|klm}$. After a sufficient lapse of synthetic aperture, the memory of this assumption will be suppressed by the data $C_{\alpha|k|0}$ fed into the integration process along the axis $m=0$ and $C_{\alpha|klm}$ and thus $F_\alpha(R,\Psi)$ will be determined. A good initial guess might shorten the synthetic aperture interval required to get the correct set of coefficients. The entire integration can in fact be regarded as a continuing improvement of the initial guess as the radar travels along its aperture.

With regard to the symmetries of the node equations, each equation (2.15) is symmetric under the substitution $m \to -m$, while data $C_{\alpha|k|0}$ will not be affected by this change. Therefore solutions will always satisfy $C_{\alpha|klm} = C_{\alpha|kl-m}$. According to (2.1), this symmetry is equivalent to the statement $F_\alpha(R, \Psi) = F_\alpha(R, \pi-\Psi)$. However, the solution was assumed valid just within the half-plane $|\Psi| \leq \pi/2$, so the symmetry imposes no restriction.

In microwave SAR, the antenna is always directed to one side, and only reflexes from this side are received. For the low frequency SAR, a corresponding condition is obtained, adopting two transversely located dipoles which separate right and left reflexes by interferometry. Both microwave and low frequency SAR consequently correspond to a reflectivity density which is zero one one side of the aircraft, and thus to the node equation system (2.15). The low frequency SAR-problem will now be treated in detail.

An $\Psi$-asymmetry will be seen to evolve in the direct method, which will not be present in the stationary method, indicating that in the former case the function $F_\alpha(R,\Psi)$ is obtained by integration of data at aircraft positions $\alpha' \leq \alpha$. An estimate $F_\alpha(R,\Psi)$ obtained by the stationary method would be based on data along an interval symmetric around $\alpha$.

According to the stationary method either of the two node equation systems (2.15) can be written $$-i\frac{\partial}{\partial\alpha}\mathbb{C}_\alpha = H\mathbb{C}_\alpha, \quad (3.1)$$

where C denotes the 2M+1-dimensional array ($C_{\alpha|k|-M}$, $C_{\alpha|k|-M+1}$, ..., $C_{\alpha|k|M}$), where $M=kR_{max}$. The index k is not otherwise active in the node equations and therefore suppressed for the sake of compactness in notation. The (2M+1)×(2M+1) matrix H is obtained from the node equations and is seen to be real, tri-diagonal and self-adjoint or Hermitean. Formally, the solution to (3.1) is the development of $C_0$ $$\mathbb{C}_\alpha = e^{i\alpha H}\mathbb{C}_0 \quad (3.2)$$

As is well-known, the exponential $e^{i\alpha H}$ of a Hermitean operator H is unitary, preserving the vector norm $\|C_\alpha\|$. The solution of (3.1) is consequently stable.

The stationary method to solve the node equations is just the standard way of looking for stationary solutions of (3.1), that is, solutions satisfying the two conditions $$-i\frac{\partial}{\partial\alpha}\mathbb{C}_\alpha = \kappa\mathbb{C}_\alpha, H\mathbb{C}_\alpha = \kappa\mathbb{C}_\alpha, \quad (3.3)$$

where $\kappa$ is a scalar. Since H is Hermitean, and $\kappa$ is an eigenvalue of this operator, it must be real.

Solutions to (3.3) are sought using the assumptions $$C_{\alpha|k|m} = e^{i\kappa\alpha}B_m, \quad B_m = B_0 e^{ix m}. \quad (3.4)$$

It is evident that the first assumption satisfies the first equation (3.3). Hence a stationary solution correspond to radar data $C_{\alpha|k|}0$ which vary with frequency $\kappa$ and amplitude $B_0$. The second purely algebraic equation assumes the form $$\kappa B_m = \frac{k}{2}(B_{m+1} + B_{m-1}). \quad (3.5)$$

It follows that $|\kappa| \leq k$, in which case we get $$\chi = \pm \arccos \frac{\kappa}{k}. \quad (3.6)$$

Accordingly, the equation (3.1) supports a twofold set of elementary solutions $$C_{\alpha|k|m} = B^{(1)} e^{i(\chi m + \kappa\alpha)} + B^{(2)} e^{i(-\chi m + \kappa\alpha)}. \quad (3.7)$$

As stated, $B^{(1)} = B^{(2)} = B/2$, which implies for data corresponding to the stationary solution $$C_{\alpha|k|0} = Be^{i\kappa\alpha}. \quad (3.8)$$

In the general non-stationary case of arbitrary radar data, decomposing the solution into stationary partial solutions, data for each such solution are determined by the two quantities k and $\kappa$ and can be obtained by a Fourier transform with respect to the $\alpha 0$—dependence of the data. Presently, consideration is given to data know on the entire y-axis. A Fourier transform of data $C_{\alpha|k|0} \to B_{\kappa|k|0}$ determines the coefficient B. By denoting $$\chi_{\kappa dk} = \arccos \frac{\kappa}{k}, \quad (3.9)$$

(3.7) reduces to $$B_{\kappa|k|m} = B_{\kappa|k|0} e^{i\gamma\kappa k m}. \quad (3.10)$$

In determining what the solution (3.10), further specified by (3.9), will look like in the R, $\Psi$-plane, a reflectivity function $F_\alpha(R, \Psi)$ is considered and restricted to just one discrete pair of spectral components k and $\kappa$. Utilizing the integral representation of Bessel functions (2.3), we obtain for the particular solution (3.4)

$$\begin{aligned}F_\alpha(R, \Psi) &= B_{\kappa|k|0} e^{i\kappa\alpha} \sum_m e^{im(\Psi+\chi\kappa k)} J_m(kR) \quad (3.11)\\ &= B_{\kappa|k|0} e^{i\kappa\alpha} \frac{1}{2\pi} \oint e^{-ikR\sin\Psi} \sum_m e^{im(\Psi+\chi\kappa k+\Psi)}d\psi\\ &= B_{\kappa|k|0} e^{i[\kappa\alpha + kR\sin(\Psi+\chi\kappa k)]}.\end{aligned}$$

Denoting $$k_y = \kappa, \quad k_x = \sqrt{k^2 - \kappa^2}, \quad (3.12)$$

it follows that $$F_\alpha(R,\Psi) = B_{\kappa|k|0} e^{-i[k_y(R\sin\Psi - \alpha) + k_x R\cos\Psi]}. \quad (3.13)$$

Consequently, the eigen-solutions (3.4) to (3.1) are plane waves determined by a 2-dimensional wave vector $k=(k_x, k_y)$.

Given a continuous reflectivity density (x,y) according to (2.7), the contribution for each of its plane wave constituents is readily obtained as $$d\rho(x, y) = B_{\kappa|k|0} e^{-i(k_y y + k_x x)} k d\kappa dk = \quad (3.14)$$

$$B_{k_y} \sqrt{k_x^2+k_y^2} \cdot 0 \cdot e^{-i(k_y y + k_x x)} k_x d k_x dk_y$$

(wherein the identity $k_x dk_x = kdk$ has been used). This is merely the original integral inversion theorem for wide band SAR data as set out in Anderson L. E. (1988): "On the determination of a function from spherical averages", SIAm J. Math Anal. 19 (1988), pp. 214–231 and Hellsten H., Andersson L. E. (1987): "An Inverse Method for the Processing of Synthetic Aperture Radar Data", Inverse Problems 3 (1987), pp. 111–124. The obvious way of implementing the original Fourier transform method numerically is as follows 1) A Fourier transform $C_{\alpha|k|} \to B_{\kappa|k|0}$ of radar data.
2) Substitution $\kappa,k \to k_x,k_y$ according to (3.12).
3) An inverse Fourier transform to obtain $\rho(x,y)$.

This method has been tested numerically and works relatively well. See, for example, Herbethson M. (1986): "A Numerical Implementation of an Inversion Formula for CARABAS Raw Data", FOA report D 30430-3.2, Linkoping. A problem with the method is the numerically difficult substitution in the frequency domain in step 2). In order to avoid this step (related to the passage from the polar format of the actual measurement to a Cartesian format of presentation) there is the alternative method of adopting a polar format (like a conventional radar PPI) also for presentation $$d\rho(R\cos\Psi, R\sin\Psi) = B_{\kappa|k|0} \sum_{m=-kR}^{kR} e^{im[\Psi + \arccos(\kappa/k)]} J_m(kR) k d\kappa dk. \quad (3.15)$$

In its stated form, this method is very computation intensive and has so far not been tested numerically.

In conclusion, it is noted that data must be available along the entire synthetic aperture intended for the image, before the Fourier transform $C_{\alpha|k|0} \to B_{\alpha|k|0}$ can be obtained. Although the stationary method provides useful means of integrating the node equation, it has the drawback of excluding real time processing.

§4 THE DIRECT METHOD.

With regard to the boundary conditions, direct integration of the node equation system can be carried out as a recursive process for the $\alpha$ variable and either $M \geq 1$ or $M \leq -1$. For example, when $m \geq 1$, the arrays $\mathbb{C}_\alpha = (C_{\alpha|k|1}, \ldots, C_{\alpha|k|M})$ are redefined. The node equation system assumes the inhomogeneous form $$-i \frac{\partial}{\partial \alpha} \mathbb{C}_\alpha = H \mathbb{C}_\alpha + \mathbb{P}_\alpha, \qquad (4.1)$$

where data enter by the source term $\mathbb{P}_\alpha = (C_{\alpha|k|0}, 0, \ldots, 0)$. The solution of (4.1) can be written symbolically as $$\mathbb{C}_\alpha = e^{i\alpha H} \left[ \mathbb{C}_0 + i \int_0^\alpha e^{-i\alpha' H} \mathbb{P}_{\alpha'} d\alpha' \right]. \qquad (4.2)$$

The initial guess is represented by $\mathbb{C}_0$.

In contrast to (3.2), (4.2) is not a unitary development and does not preserve the vector norm $\|\mathbb{C}_\alpha\|$. It is however observed that the first term in (4.2) is a unitary transformation of the initial guess. This guess will thus be ever present in the solution, as it unfolds along the y-axis. Since this unfolding affects F by translation (along the axis of the aircraft motion), the initial guess will eventually move away and only be of consequence at large ranges. This purely translative behavior will to some degree be upset by the truncation of the vectors $\mathbb{C}_\alpha$ to $|m| \leq M$. Since $J_m(kR) \approx 0$ if $|m| \geq kR$, the solution will be affected by this truncation at ranges where $R \geq M/k$, and thus, as the solution moves backward behind the aircraft, it will eventually become noisy and unreliable. However, M may be chosen sufficiently large so that the solution will be unaffected by truncation for those ranges which contribute to the synthetic aperture. This means effectively that for obtaining $F_\alpha(x,0)$; $0 \leq x \leq x_{max}$, one must assume $$M = kR_{max} > k \sqrt{x_{max}^2 + \alpha^2}, \qquad (4.3)$$

where $\alpha$ is the aperture required.

Related to the issue of losing information by truncation, there is a corresponding issue of gaining information by the data fed into the process. In fact a solution $C_{\alpha|k|m}$, non-zero only for $|m| \leq M$, will not contain any information about objects detectable by an angular resolution finer than $\Delta\Psi = 2\pi/M$. This will mean that neither small objects at close ranges nor large objects at large ranges are detectable. As the aircraft moves along the aperture these far-off objects may (if they are located in front of the aircraft) come closer and thus also become detectable at the available resolution $\Delta\Psi = 2\pi/M$. The information originally lacking for their description is fed into the process by the radar data entering as the coefficients $C_{\alpha|k|0}$.

Because of noise introduced as the solution moves backward behind the current position of the aircraft, $F_\alpha(R, \Psi)$ is expected to become unreliable for $\Psi$ negative. In the direction of positive $\Psi$, resolution will be insufficient though increasing with decreasing $\Psi$. In all, the optimum image would be obtained in the directions in the vicinity of $\Psi=0$. This intuitive argument is supported by the numerical tests which were performed, and which will be described below.

With regard to methods for finite incrementation, as for numerical implementation of the direct method, one has to take into account both the question of numerical stability and precision.

Stability is guaranteed for the stationary method by the unitarity of the homogeneous development in (3.1). for the direct method the unitarity is lost already on the analytical level, as is clear from the expression (4.2), in which just the first term on the right-hand side is a unitary operator. Still, analogous to a diffusion equation, the rate of growth of the norm of the solution will be controlled by properties of the data fed into the solution. Only by a careless numerical implementation in finite steps, the solution would become unstable and lose its significance. A possible method is to rewrite (4.2) as a trapezoidal scheme analogous to the Crank-Nicholson scheme used for the Schrödinger equation, which by itself is unitary. The trapezoidal method is of order $(\Delta\alpha)^2$, where $\Delta\alpha$ is the step size along the y-axis. It is however implicit and requires the solution of tridiagonal systems of equations.

Another possibility is to use an explicit method, which may not be exactly unitary, but possesses very high accuracy. It will thus approximate the behavior of the analytical solution sufficiently well not to cause unstable behavior in the practical cases we consider. This approach is preferred because the lack of numerical precision will affect resolution.

It is important to recognize that in adopting high precision methods, there is a departure from the analogy between the node equation system and partial differential equations. Presently the difference on the right-hand side of (2.15) is not just an approximation of a second order derivative but in fact an exact expression. Therefore, the emphasis is on approximating the derivative in the $\alpha$-direction, for which there is a wide choice of higher order methods, used for ordinary differential equations. In the numerical tests, the Runge-Kutta method has been adopted, in its classical form, which is an explicit method of the order $(\Delta\alpha)^4$. The choice between different methods is of course also very much a matter of computer border. The trapezoidal and Runge-Kutta methods are comparable in this respect.

With regard to the numerical tests, the primary concern has been to verify the recursive integration process. Data set sizes are not intended to be realistic. In addition to results approximating the entire process involving (2.1), results for only a fixed value of k are displayed.

Extensive numerical testing has been performed. The results displayed in FIGS. 2a–4b refer to the case when a point reflector is located at $(x,y)=(64,140)$. As pointed out in §3 above, the solution $\mathbb{C}_{ideal|\alpha}$ to this problem will exhibit the symmetry $\Psi \to \pi - \Psi$. Hence $$\mathbb{C}_{ideal|\alpha} = \{c(64,140)_{\alpha|1|m} + c(-64,140)_{\alpha|1|m}; m=1, \ldots 128\}, \qquad (4.4)$$

where $c(x,y)$ is defined by (2.9). The data vector $\mathbb{P}_\alpha$ is also obtained from (2.9). For SAR systems in general, data would be collected along the aperture at a spacing $\Delta\alpha$ no coarser than half the antenna aperture, denoted $\Delta\alpha_{lim}$. On the other hand, the finest possible azimuth resolution also equals $\Delta\alpha_{lim}$. The value of k is related by $k=2\pi/\lambda$ to the wavelength $\lambda$ of the Bessel functions in (2.1), as these asymptotically settle to a periodic behavior. The ground, described at this resolution, has a spatial frequency bandwidth of $k_{max}=\pi/\Delta\alpha_{lim}$. setting $k_{max}=1$, yields $\Delta\alpha_{lim}=\pi$. Generally, all distances are measured in radians with respect to an assumed spatial wavelength $\lambda=2\Delta\alpha_{lim}$ (equal to the antenna aperture).

The number M must be chosen in accordance with (4.3). For the case with a point reflector at (64,140) M=128 has been chosen. For comparison, tests with M=256 have been made but no noticeable improvement was achieved and those comparisons are not included herein. After some initial tests with the trapezoidal method, integration of (4.1) has been based on the Runge-Kutta method, as discussed. Various step sizes $\Delta\alpha<\pi$ have been tried.

In the results that are presented, the assumption $\mathbb{C}_0=0$ is used as an initial guess. Computing $\mathbb{C}_\alpha$ the sum is displayed $$\sum_{m=-128}^{128} C_{\alpha|1|m} e^{im\Psi} J_m [\sqrt{64^2 + (140-\alpha)^2}], \qquad (4.5)$$

which is the contribution to the reflectivity density (2.1) for the particular choice k=1, and for the range $R_{\alpha|ref}$ of the point reflector at aircraft position α. In a loose sense, one might understand (4.5) as the restriction to $R=R_{\alpha|ref}$ of the reflectivity density, obtainable by means of the SAR principle, for a radar system operating on just a single frequency, with zero bandwidth. FIGS. 2a, 2b, 2c, 2d, illustrate the result for Δα=1.75 and α=35, 105, 140 and 175, where angles are measured in the positive direction, according to FIG. 1.

The FIGS. 3a, 3b, 3c are based on the same type of computation, but illustrate the effect of choosing different step sizes for the incrementation. Again the sum (4.5) is displayed, but now for a fixed aircraft position α=105 and variable step sizes Δα=0.5, Δα=1.5 and Δα=2.1. For the purpose of comparison, $C_{ideal|105}$ is included in FIG. 3d. It is indeed evident that the estimated solutions $C_\alpha$ converge to $C_{ideal|\alpha}$ as Δα→0. The noisiness on the backside of the aircraft is also evident, as well as the fact that the level of this noise increases as Δα increases. Letting the increment approach $\Delta\alpha_{lim}=\pi$, the method broke down.

Finally, the effect of k-integration is illustrated. Doing so, it is assumed that $k_{max}=1$ corresponds to the shortest wavelength $\lambda_{min}$ of a wide band signal. Corresponding to $(kR)_{max}=M=128$, one has $R_{max}=128$. The fundamental frequency of the range dependence would be $2\pi/2R_{max}\approx 1/40$, according to which (taking into account that Bessel functions are similar to, but not pure, sinusoids) the Δk– increments should be chosen to be less than 1/40. In order not to introduce any significant errors at this stage, Δk=0.01 was chosen letting k vary between 0.01 and 1 at this step size. Moreover, choosing the size of the ℂ-vectors fixed, rather than dependent on k, the integral is approximated in (2.1) as $$\sum_{n=1}^{100} \sum_{m=-128}^{128} C_{\alpha|0.01n|m} e^{im\Psi} J_m[0.01nR]. \quad (4.6)$$

FIG. 4a provides an example of the Ψ-dependence of $F_\alpha(R,\Psi)$ by the function $F_{175}(R_{175|ref}, \Psi)$ whereas FIG. 4b illustrates the R-dependence by the example $F_{175}(R, \Psi_{175|ref})$, where $\Psi_{\alpha|ref}$ denotes the angle of the point reflector at aircraft position α. The noticeable ringing of the R-dependence is believed to be due to the lack of tapering of the k spectrum.

As for the resolution obtained, it was previously stated that the optimal azimuth resolution is $\Delta\alpha_{lim}=\pi$, measured as a distance along the aperture. The corresponding angular resolution $\Delta\Psi_{lim|\alpha}$, say at the positions α=105 or α=175, will be $\pi/R_{105|ref}=\pi/R_{175|ref}\approx 0.05$. This is indeed the width of the peak of the true solution, seen in FIG. 3d. However the width of the peak of the calculated solution in FIG. 4a is also very close to this limit.

Since the aircraft has only moved half the antenna aperture as the reflector is transverse to the aircraft, the resolution of the estimated solution is expected to be $2\Delta\Psi_{lim|140}\approx 0.1$. This is indeed the resolution seen in FIG. 2c.

The FIGS. 3a, 3b, 3c, illustrate that the resolution obtained at a certain aircraft position decreases with increasing step size, and thus depends on the precision of the numerical method. However, the tests also indicate that near optimum resolution also may be reached for a large step size, although the amount of aperture required to obtain this resolution becomes larger.

§5 CONCLUSIONS.

As previously stated, the numerical tests have been performed in order to study the basics of the direct method, and not as a realistic simulation of a radar system. These tests suggest however that the principle may be useful in realistic cases as well.

In the tests, the angular resolution ΔΨ≈0.05 radians was attained on the basis of a ℂ-vector size m=128. The number of arithmetic operations for calculating $C_\alpha$ for all values of k during one iteration are of the order $m^2$, while the resolution ΔΨ is expected to be inversely proportional to M. Calculating $C_\alpha$ can be done in parallel for all values of k. If real time capacity is required, one needs to use massively parallel computer architectures, in which case the computing rate for this type of operations may be of the order 1 Gflops. The time for carrying out one iteration must not exceed the time it takes for the aircraft to move one antenna length, say 0.01 s. It follows that M-values of the order M=5000 can be handled, which would imply that an angular resolution of the order 1 mrad may be attained by real time processing.

One obstacle, in realistic applications, is the need to compute the integrals (2.1) and (2.5) the Bessel functions involved. As for the zero Hankel transform (2.5), fast methods are known (e.g. the method developed by Hansen according to Hansen E. W. (1985): "Fast Hankel Transform Algorithm", IEEE Trans. Acoustt., Speech, Signal Processing, vol ASSP-33 (1985), pp. 666–671, useful for first order Hankel transforms as well). For (2.1), it is observed that in a real time processing mode, the direct method enables use of the SAR as a "line camera". An obvious consequence of (2.7) is $$\rho(R\cos\Psi_0, y+R\sin\Psi_0)=F_y(R,\Psi_0). \quad (5.1)$$

Accordingly, the reflectivity density ρ(x,y) can be obtained, computing (2.1) for $\Psi_0$, at a fixed direction, sufficiently to the rear to provide the required resolution, but at every aircraft position along the y-axis. In order to determine $F_\alpha(x, \Psi_\alpha)$ from the vectors $C_\alpha$, if is noted that, for $\Psi_0$ fixed, the terms $C_{\alpha|k|m} e^{im\Psi} j_m(kx)$, are dependent according to a fixed set of recurrence relations obtained from (2.11). Such dependence leads to the so-called Clenshaw's algorithm (described in Press W. H. et al. (1986): Numerical Recipes, Cambridge University Press, Cambridge.), which presently reduces the right-hand side to just two Hankel transforms, with respect to the zero and first order Bessel functions, which both can be dealt with by Hansen's method, for example.

Apart from the requirement of real time processing, the method seems advantageous as regards the problem of motion compensation in Sar. Though this case was not pursued from the outset, the effect on the node equations of a non-linear aircraft path is fairly obvious. If a certain turning δΨ of the aircraft occurs for each iteration step, this turning can be compensated for by phase shifts $C_{\alpha|k|m} \to e^{-im\delta\Psi} C_{\alpha|k|m}$, intervening with the iterations. If there is a certain acceleration δα along the aircraft path, this can be implemented as a change of step size Δα+δα. Clearly, for motion compensation to be possible, the aircraft path should be known (preferably in the form of angular and linear accelerations).

Finally, it is emphasized that the methods disclosed herein have been motivated by the requirement for wide band low frequency SAR. However, it seems that the direct method, with some changes as regards the nature of the data fed into the process, can be used for conventional microwave SAR as well. The benefits of the method for narrow band SAR processing have yet to be studied, as compared to other methods available in this case.

I claim:

1. A Signal processing apparatus for use in SAR radar having a radar transmitter, an antenna system for transmission and reception and a radar receiver, said signal processing apparatus being adapted for recursive computation of SAR images and comprising:

A) at least one memory, in which an SAR image with respect to a certain aircraft position of an aircraft along a flight path, is represented in the form of a coefficient matrix, an element of which are complex frequency components with respect to radial and angular frequency of the SAR image;

B) a first at least one computation unit, in which radar data as a function of range, are transformed to a data vector with respect to different radial frequencies;

C) a second at least one computation unit for computing, based on the coefficient matrix of said at least one memory, the data vector from the first at least one computation unit and information about a speed of the aircraft, and also based on a node equation, a second coefficient matrix with respect to a new aircraft position of said aircraft that is different from said certain aircraft position by a translation, free from rotation, of a distance that is smaller than a radar resolution and is a basis for a resolution in an image that represents radar data;

D) a third at least one computation unit for rotating said second coefficient matrix obtained as output from said second at least one computation unit based on a turning of the aircraft during the translation, if any, to produce a rotated coefficient matrix and for storing said rotated coefficient matrix in said at least one memory;

E) a fourth at least one computation unit, which, upon computation of said rotated coefficient matrix, by an inverse transformation from angular frequency to angular dependence, compresses all angular frequency terms for a given radial frequency to one number and thereby the rotated coefficient matrix to a line vector that defines the spectrum of the SAR image along an image line in a direction to a side of the aircraft;

F) an additional computation unit, which, by an inverse transformation from radial frequency to radial dependence, transforms the line vector to the SAR image along the image line.

2. A signal processing apparatus according to claim 1, wherein the coefficient matrix includes several coefficient vectors, each coefficient vector corresponding to a radial frequency, and consisting of coefficients for different angular frequencies at the radial frequency, and wherein few of said coefficient vectors lie in each memory.

3. A signal processing apparatus according to claim 2, wherein said second at least one computation unit includes a plurality of individual computation units working on individual coefficient vectors instead of the complete coefficient matrix.

4. A signal processing apparatus according to claim 2, wherein said third at least one computation unit includes a plurality of individual computation units working on individual coefficient vectors instead of the complete coefficient matrix.

5. A signal processing apparatus according to claim 2, wherein said fourth at least one computation unit includes a plurality of individual computation units working on individual coefficient vectors instead of the complete coefficient matrix.

6. A signal processing apparatus according to claim 1, wherein the signal processing apparatus consists of a large number of circuits that work simultaneously in parallel, each of said circuits registering and computing a few coefficient vectors.

7. A signal processing apparatus according to claim 3, wherein computation is performed using a trapezoidal method for propagation of a first order ordinary differential equation applied to the node equation.

8. A signal processing apparatus according to claim 3, wherein computation is performed using Runge-Kutta methods for propagation of a first order ordinary differential equation applied to the node equation.

9. A signal processing apparatus according to claim 5, wherein computation is performed according to Clenshaw's algorithm.

10. A signal processing apparatus according to claim 1, wherein said fourth at least one computation unit provides an image line that points at a given compass direction all the time based on guidance information that is obtained from an inertial navigation system of the aircraft.

11. A signal processing apparatus for use in SAR radar having a radar transmitter, an antenna system for transmission and reception and a radar receiver, said signal processing apparatus being adapted for recursive computation of SAR images and comprising:

memory means in which an SAR image with respect to a certain aircraft position of an aircraft along a flight path, is represented in the form of a coefficient matrix, an element of which is complex frequency components with respect to radial and angular frequency of the SAR image;

first computation means for transforming radar data as a function of range to a data vector with respect to different radial frequencies;

second computation means for computing a second coefficient matrix with respect to a new aircraft position, based on the coefficient matrix of said memory, the data vector from the first computation means and information about a speed of the aircraft, and also based on a node equation, said new aircraft position being different from said certain aircraft position by a translation, free from rotation, of a distance that is smaller than a radar resolution and is a basis for a resolution in an image that represents radar data;

third computation means for rotating said second coefficient matrix obtained as an output from said second computation means based on a turning of the aircraft during the translation, if any, to produce a rotated coefficient matrix, and for storing said rotated coefficient matrix in said memory;

fourth computation means for compressing, upon computation of said rotated coefficient matrix, by an inverse transformation from angular frequency to angular dependence, all angular frequency terms for a given radial frequency to one number and thereby the rotated coefficient matrix to a line vector that defines the spectrum of the SAR image along an image line in a direction to a side of the aircraft;

a computation unit, which, by an inverse transformation from radial frequency to radial dependence, transforms the line vector to the SAR image along the image line.

12. A signal processing apparatus according to claim 11, wherein the coefficient matrix includes several coefficient vectors, each coefficient vector corresponding to a radial frequency, and consisting of coefficients for different angular frequencies at the radial frequency, and wherein few of said coefficient vectors lie in each memory means.

13. A signal processing apparatus according to claim 12, wherein said second computation means includes a plurality of individual computation units working on individual coefficient vectors instead of the complete coefficient matrix.

14. A signal processing apparatus according to claim 12, wherein said third computation means includes a plurality of individual computation units working on individual coefficient vectors instead of the complete coefficient matrix.

15. A signal processing apparatus according to claim 12, wherein said fourth computation means includes a plurality of individual computation units working on individual coefficient vectors instead of the complete coefficient matrix.

16. A signal processing apparatus according to claim 15, wherein computation is performed according to Clenshaw's algorithm.

17. A signal processing apparatus according to claim 11, wherein said signal processing apparatus consists of a plurality of circuits that work simultaneously, in parallel, each of said circuits registering and computing a few coefficient vectors.

18. A signal processing apparatus according to claim 13, wherein computation is performed using a trapezoidal method for propagation of a first order ordinary differential equation applied to the node equation.

19. A signal processing apparatus according to claim 13, wherein computation is performed using Runge-Kutta methods for propagation of a first order ordinary differential equation applied to the node equation.

20. A signal processing apparatus according to claim 11, wherein said fourth computation means provides an image line that always points at a given compass direction based on guidance information provided by an inertial navigation system of the aircraft.

* * * * *